US008037178B1

(12) United States Patent
Agarwalla et al.

(10) Patent No.: US 8,037,178 B1
(45) Date of Patent: Oct. 11, 2011

(54) SYSTEM AND METHOD FOR PROVIDING SECURE ACCESS TO A REMOTE DESKTOP ACROSS FIREWALLS IN AN INTERACTIVE GRID ENVIRONMENT

(75) Inventors: Bikash Agarwalla, Palo Alto, CA (US); Sujoy Basu, Mountain View, CA (US); Vanish Talwar, Palo Alto, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1813 days.

(21) Appl. No.: 10/666,093

(22) Filed: Sep. 19, 2003

(51) Int. Cl.
*G06F 15/173* (2006.01)
*G06F 15/16* (2006.01)
(52) U.S. Cl. .................. 709/225; 709/229
(58) Field of Classification Search ............. 709/203, 709/217, 219, 223, 227, 225, 229
See application file for complete search history.

(56) References Cited

U.S. PATENT DOCUMENTS

| | | | | |
|---|---|---|---|---|
| 6,026,430 A * | 2/2000 | Butman et al. | ................ | 709/203 |
| 6,618,709 B1 * | 9/2003 | Sneeringer | ................... | 705/412 |
| 6,820,204 B1 * | 11/2004 | Desai et al. | ...................... | 726/6 |
| 7,120,692 B2 * | 10/2006 | Hesselink et al. | ............ | 709/225 |
| 7,127,745 B1 * | 10/2006 | Herse et al. | ..................... | 726/30 |

* cited by examiner

*Primary Examiner* — Hussein Elchanti

(57) ABSTRACT

A system and method for secure access to a remote desktop across firewalls in an interactive grid environment is disclosed. Embodiments of the present invention include an interactive grid computing system comprising an interactive grid computing service provider comprising: a resource for use over the interactive grid, a first firewall for protecting the resource and a remote display server for providing a secure connection and for providing interactive graphical data associated with the resource. The system further comprises a client comprising: a second firewall protecting the client and a remote display resource for providing a secure connection and for viewing the interactive graphical data provided by the remote display server.

15 Claims, 6 Drawing Sheets

SYSTEM AND METHOD FOR PROVIDING SECURE ACCESS TO A REMOTE DESKTOP ACROSS FIREWALLS IN AN INTERACTIVE GRID ENVIRONMENT

TECHNICAL FIELD

Embodiments of the present invention relate to a grid computing environment, and more particularly to secure access to a remote desktop across firewalls.

BACKGROUND ART

Grid computing is a method of harnessing the power of many computational resources in a network. Grid computing is a distributed computer infrastructure involving large-scale sharing applications and/or high performance processing and network bandwidth.

Referring to FIG. 1, a grid computing environment comprising a plurality of heterogeneous computing nodes distributed across multiple administrative domains. A virtual organization (e.g., VO-X, VO-Y, and VO-Z) may include nodes from different domains. For example, VO-Z includes nodes from each of Administrative Domains 110, 120, and 130.

A node (hereinafter also referred to as a computing resource) may be a member of several virtual organizations. An end-user (e.g., USER M, USER N, or USER O) may need to access remote nodes either in the same administrative domain, or across domains. For example, User O may access VO-Y from within Domain 120, or User N within Domain 130 may access the same node from outside of Domain 120. Similarly, User M of Domain 130 may access both VO-Y and VO-Z through a single node in Domain 110.

Traditionally, grid computing has provided for the execution of batch jobs in the scientific and academic community. Batch execution on a grid computing environment requires authentication, authorization, resource access, resource discovery, and other services. In support of batch processing of jobs on a grid computing environment, protocols, services, application programming interfaces, and software development kits have been developed. The conventional method and system are not particularly suited for interactive grid computing sessions.

In a grid computing environment, security can be a concern. As a result, a grid computing service, providing access to desktops for use, may reside behind a firewall. In addition, a user that is accessing a grid computing resource, may reside behind another firewall. Conventional methods for providing grid computing resources cannot traverse firewalls and provide a secure connection simultaneously.

Port forwarding can be used to traverse firewalls between organizations. In this solution a third party host is needed between firewalls which is accessible from both organizations. Both organizations need to connect to this bridge host to open a tunnel.

This solution may be fine for academic settings, but in commercial environments, the client may not want to go over an intermediate bridge for connecting to the ASP. Also, bridge host needs to be especially set up in order to do port forwarding.

A grid computing infrastructure that can hide the complexities of resource management from the user and that can provide secure graphical and multimedia interactive sessions is needed.

DISCLOSURE OF THE INVENTION

Embodiments of the present invention provide a system and method for providing secure access to a remote desktop across firewalls in an interactive grid environment. In one embodiment of the invention, tunneling is used to traverse a firewall in a virtual network computing (VNC) environment.

Embodiments of the present invention also include an interactive grid computing system comprising an interactive grid application service provider comprising: a resource for use over the interactive grid, a first firewall for protecting the resource and a remote display server for providing a secure socket layer (SSL) connection and for providing interactive graphical data associated with the resource. The system further comprises a client comprising: a second firewall protecting the client and a remote display resource for providing a secure socket layer (SSL) connection and for viewing the interactive graphical data provided by the remote display server.

BRIEF DESCRIPTION OF THE DRAWINGS

The above and other objects and advantages of the present invention will be more readily appreciated from the following detailed description when read in conjunction with the accompanying drawings, wherein.

Prior Art

BEST MODES FOR CARRYING OUT THE INVENTION

Figure 1:
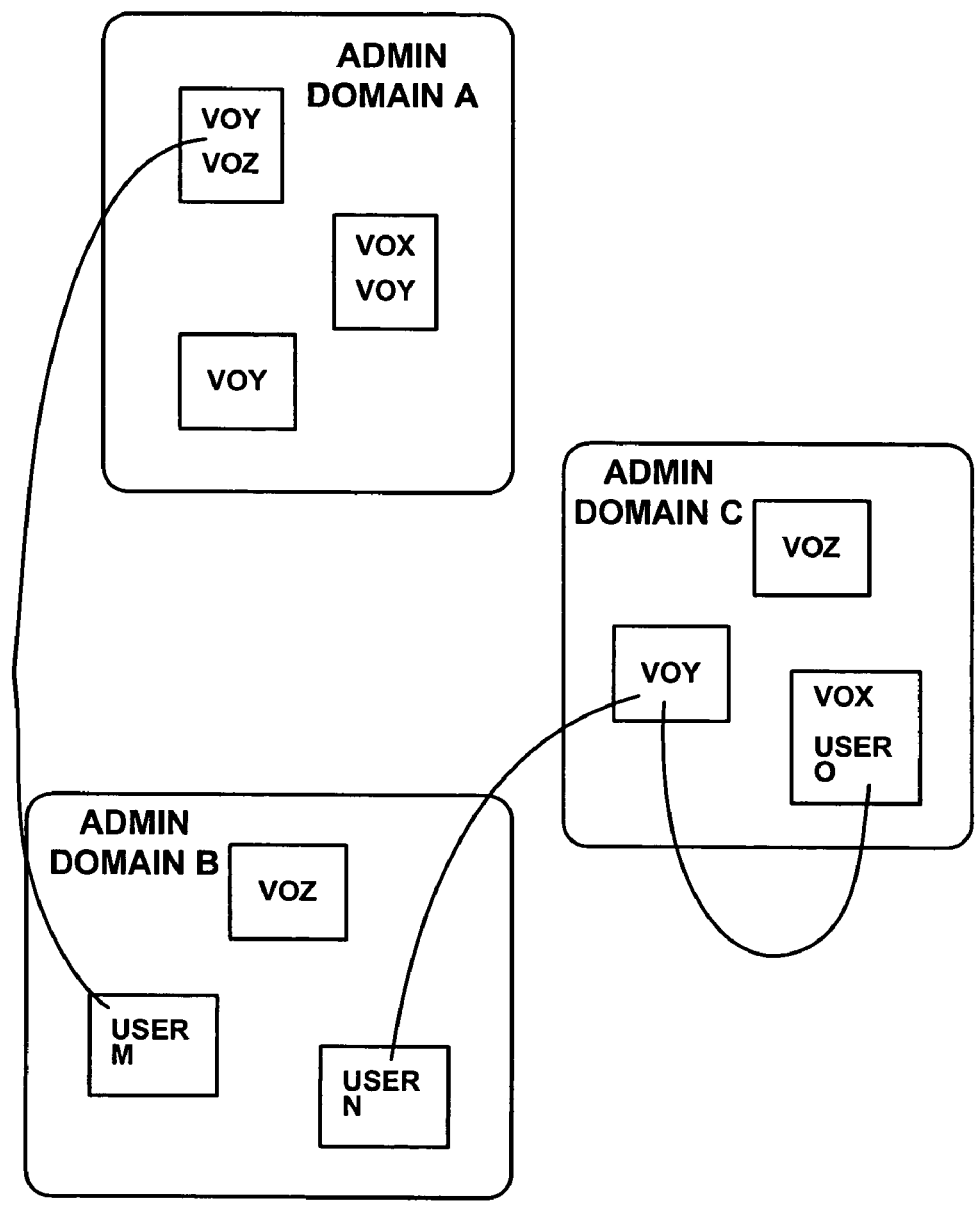
FIG. 1 is an illustration of a grid computing environment.

Reference will now be made in detail to embodiments of the present invention, a system and method for providing secure access to a remote desktop across firewalls in an interactive grid environment, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing secure access to a remote desktop across firewalls in an interactive grid environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "displaying," or "connecting," or "providing," or "initiating," or "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide secure access to a remote desktop across firewalls in an interactive grid environment. As a result, other embodiments of the present invention serve the above purpose and are able to provide secure access to a remote desktop across firewalls by tunneling through a socks proxy server. Because of secure interactive access across firewalls, the present invention is significantly less susceptible to attack than previous techniques in the prior art for providing access to remote resources based solely on unsecured connections that do not traverse firewalls. More specifically, modifying a VNC viewer to provide a secure SSL connection, the present invention is capable of tunneling through firewalls and providing secure access to a remote desktop. Moreover, other embodiments of the present invention serve the above purposes and provide for secure interactive grid sessions, resulting in an improved grid computing environment that can be interactive and can provide secure remote access, even across firewalls.

Grid Computing Environment for Conducting Interactive Computing Sessions

Figure 2:
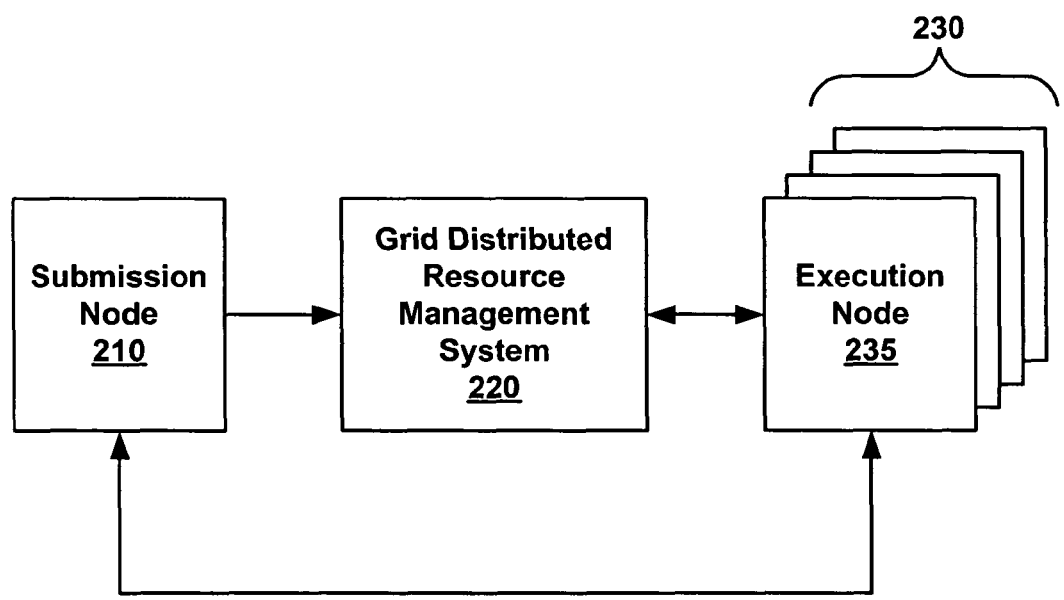
FIG. 2 is a data flow diagram illustrating the flow of information when implementing a grid computing environment, in accordance with one embodiment of the present invention.

Referring now to FIG. 2, a data flow diagram is shown illustrating the implementation of an exemplary grid computing system 200, in accordance with one embodiment of the present invention. The grid computing system consists of a plurality of heterogeneous execution nodes 230 distributed across multiple administrative domains. That is, the plurality of heterogeneous execution nodes reside in remote locations that are coupled together through a communication network, such as, the Internet. The plurality of heterogeneous execution nodes can be configured in any type of formation, for example, a plurality of clusters or nodes. The plurality of execution nodes 230 is managed by a grid distributed resource management (DRM) system 220.

The grid computing system 200 is capable of supporting graphical interactive sessions. A general discussion describing graphical interactive sessions is provided in the following co-pending U.S. patent application assigned to the present assignee: Ser. No. 10/340,436, entitled "GRID COMPUTING CONTROL SYSTEM," by Talwar et al., filed on Jan. 10, 2003, the disclosure of which is hereby incorporated herein by reference.

In the data flow diagram of FIG. 2, an end-user submits a request for an interactive session to the grid DRM through a submission node 210. On receiving the request from the user the grid DRM selects a remote execution node 235 based on the session requirements, and reserves this node 235 for the requested duration of the session. In addition, the grid DRM also performs an advance reservation of fine grained resources like central processing unit (CPU) and network bandwidth for the user's session. At the requested time, the grid DRM would establish an interactive session between this remote execution node 235 and the end-user's submission node 210. The end-user then interacts directly with this remote execution node 235 through the established session.

Figure 3:
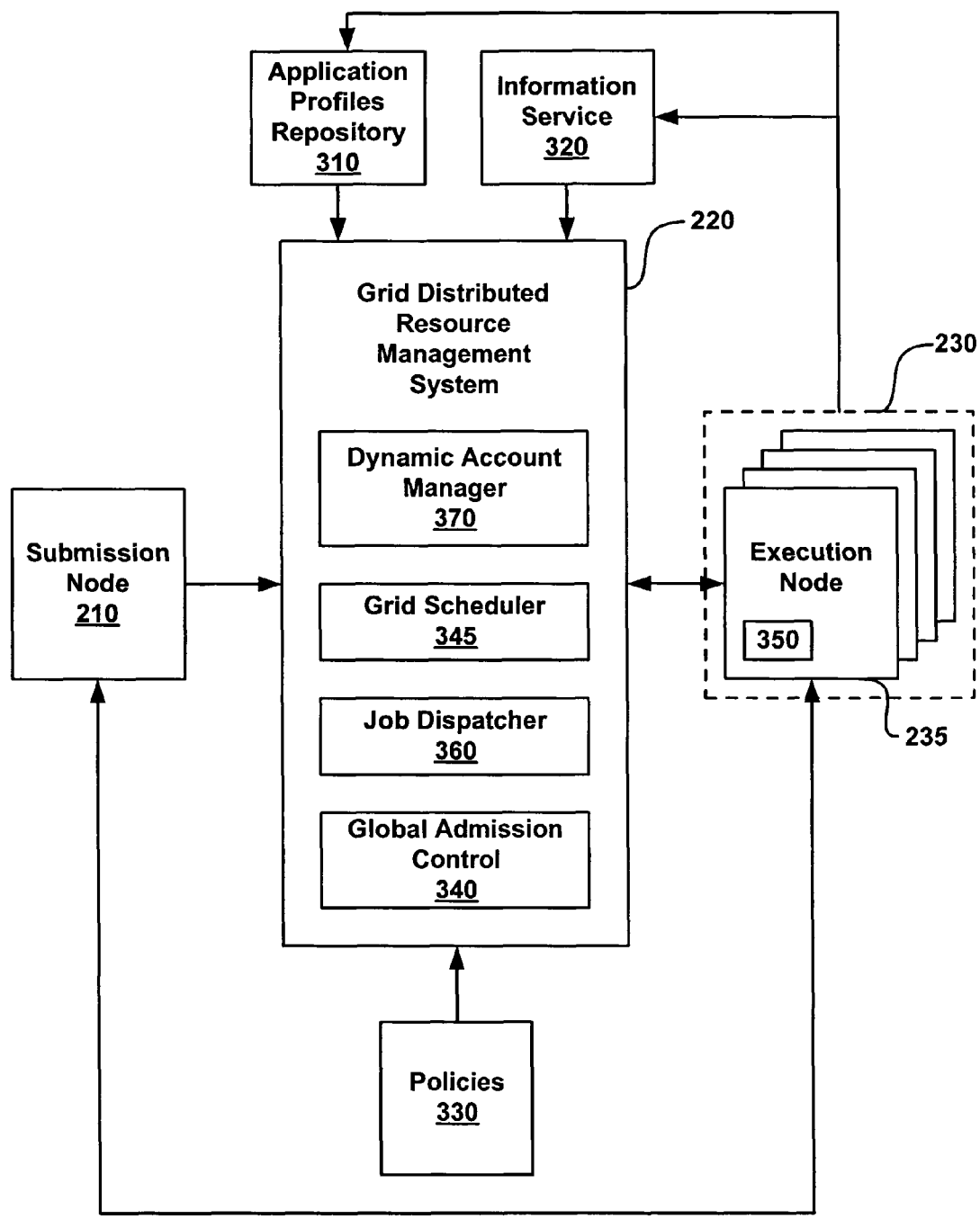
FIG. 3 is a block diagram illustrating an exemplary grid computing environment, in accordance with one embodiment of the present invention.

Referring now to FIG. 3, a block diagram of an exemplary grid computing environment 300 is shown in more detail, in accordance with one embodiment of the present invention. The grid computing environment 300 comprises a submission node 210, a grid scheduler node 220, and a plurality of execution nodes 230, as previously described in relation to FIG. 2. In addition, each of the blocks in FIG. 3 within the grid computing environment 300 are remotely located, in one embodiment. Also, the configuration of the blocks allows for the inclusion of one or more blocks located in one node location. The blocks in FIG. 3 are communicatively coupled together through a network, such as, the Internet.

In addition, the grid computing environment 300 also comprises an information service 320. The information service 320 stores information about the computing resources associated with and located at each of plurality of execution nodes 230. In addition, an application profiles repository 310 stores the application profiles of the grid computing environment 300. The policies module 330 provides the rules and policies for implementing and running the grid computing environment 300.

In one embodiment of the present invention, the end-user can submit requests directly to the remote execution node 235, to launch multiple applications. A session launching multiple applications is defined as a global interactive session. This global interactive session thus constitutes the interaction of the end-user with the remote node, and involves the launching of one or more applications. Subsequently, the end-user in the session uses and interacts with the launched applications through separate per-application sessions. These interactions could be textual or graphical based. As such, the grid computing system 200 supports graphical interactive sessions between end-users and remote execution nodes. An example of a global interactive session is a remote display session wherein the graphical desktop of the remote execution node 235 is exported to the submission node 210.

In another embodiment of the present invention, the end-user submits requests to launch a single application. A session launching one application is defined as a per application interactive session. A per-application interaction session constitutes the association between the end-user and the executing application, where the end-user interacts directly with the application. A per-application interactive session occurs in the context of a global interactive session.

In one embodiment, a hierarchical admission control is achieved through the implementation of global and per-application interactive sessions. Admission control is implemented through a global admission control module 340 at the grid DRM node 220, and a per-application session admission control module 350 at the selected remote execution node 235. The global admission control module 340 and the per-application admission control module 350 make admission control decisions for global and per-application sessions, respectively.

The following is the sequence of steps for initiating global and per-application sessions, in accordance with one embodiment of the present invention. To start, the end-user creates a job request template for a new global interactive session, specifying the resource requirements, session requirements, and the desired list of applications to be launched during the session. This request is submitted to the grid DRM node 220 from the submission node 210.

The request is received by a grid scheduler 345 running on the grid DRM node 220. In the first pass, the grid scheduler 345 performs a matching of resources in the plurality of remote execution nodes 230 to satisfy the coarse requirements of the user, for example, matching of the hardware requirements of the user. The grid DRM 220 provides a distributed repository where various resources can publish their services, in one embodiment. The grid scheduler 345 queries this distributed repository, as well as the application profiles repository 310 and the information service 320, to discover resources that match with the user's job needs.

In the next pass, the grid scheduler 345 selects the best remote execution node that can admit the requested global interactive session satisfying the quality-of-service (QoS) requirements for the desired list of applications to be launched during the global session. During this step, the grid scheduler 345 interfaces with the global admission control system 340, which performs the admission for the requested global interactive session.

At this time, a reservation is made on the selected remote execution node 235 for the requested global interactive session. The reservation is also made for fine grained resources such as CPU, network bandwidth, etc.

At the requested time, the selected remote execution node 235 is allocated to the end-user, and a job dispatcher 360 at the grid DRM 220 dispatches the request for the new global interactive session to the remote execution node 235. In addition, service level agreements (SLA) for the session are passed to the remote execution node 235.

A configuration process configures the system before launching the global interactive session. This involves the creation of a dynamic account by a dynamic account manager 370 at the grid DRM 220. A global interactive session is then initiated between the allocated execution node and the end-users' submission node. The dynamic account manager 370 maintains pools of dynamic accounts on each resource. Unlike normal user accounts which remain permanently assigned to the same real-world user, a dynamic account is assigned to a user temporarily. After the user has been authenticated, the user may be authorized to use a normal static account if authorized, or the user may be assigned a dynamic account from a pool of dynamic accounts.

Alternately the user's membership in a virtual organization (VO) may be verified by a directory service maintained by the VO. In that case, a dynamic account from the pool maintained for that VO can be assigned to the user. This approach is more scalable since every user joining or leaving a VO does not require the addition or deletion of a file entry on all the resources made available to the VO.

The end-user can now request new per-application interactive sessions directly through the started global interactive session. The requests for per-application interactive sessions are verified for access control checks, and if successful are passed onto the session admission control system 350 on the associated remote execution node (e.g., execution node 235). The session admission control system 350 performs an admission control check to determine if the requested per application session can be admitted into the global interactive session. If not, the request for new per-application session is denied. Otherwise, the per-application session is started.

In addition, for QoS purposes, resource management monitoring agents monitor the global interactive session and per-application session utilization values. The monitored data is aggregated by aggregator agents. Enforcement agents use this data to enforce the SLA and QoS requirements. For example, the enforcement agents can end the global interactive session at the time specified in the SLA. After the global interactive session is ended, the execution node is now freed up to execute a new global interactive session if scheduled by the grid scheduler 345.

A System and Method for Providing Secure Access to a Remote Desktop Across Firewalls in an Interactive Grid Environment Application service providers (ASPs) provide customers the ability to use applications without owning the software or the infrastructure needed to run the application. Embodiments of the present invention provide traditional business customers, digital content creators, scientists doing visualization of large data sets, software developers, and design engineers using electronic or mechanical computer aided design (CAD) tools a system for interactively using applications in a grid environment that is protected by a firewall. Embodiments of the present invention provide access to a graphical representation of a full desktop of a computer accessed on an interactive grid computing system. Providing access to the entire desktop of a remote computer provides interactive use of a resource on the remote computer.

Figure 4:
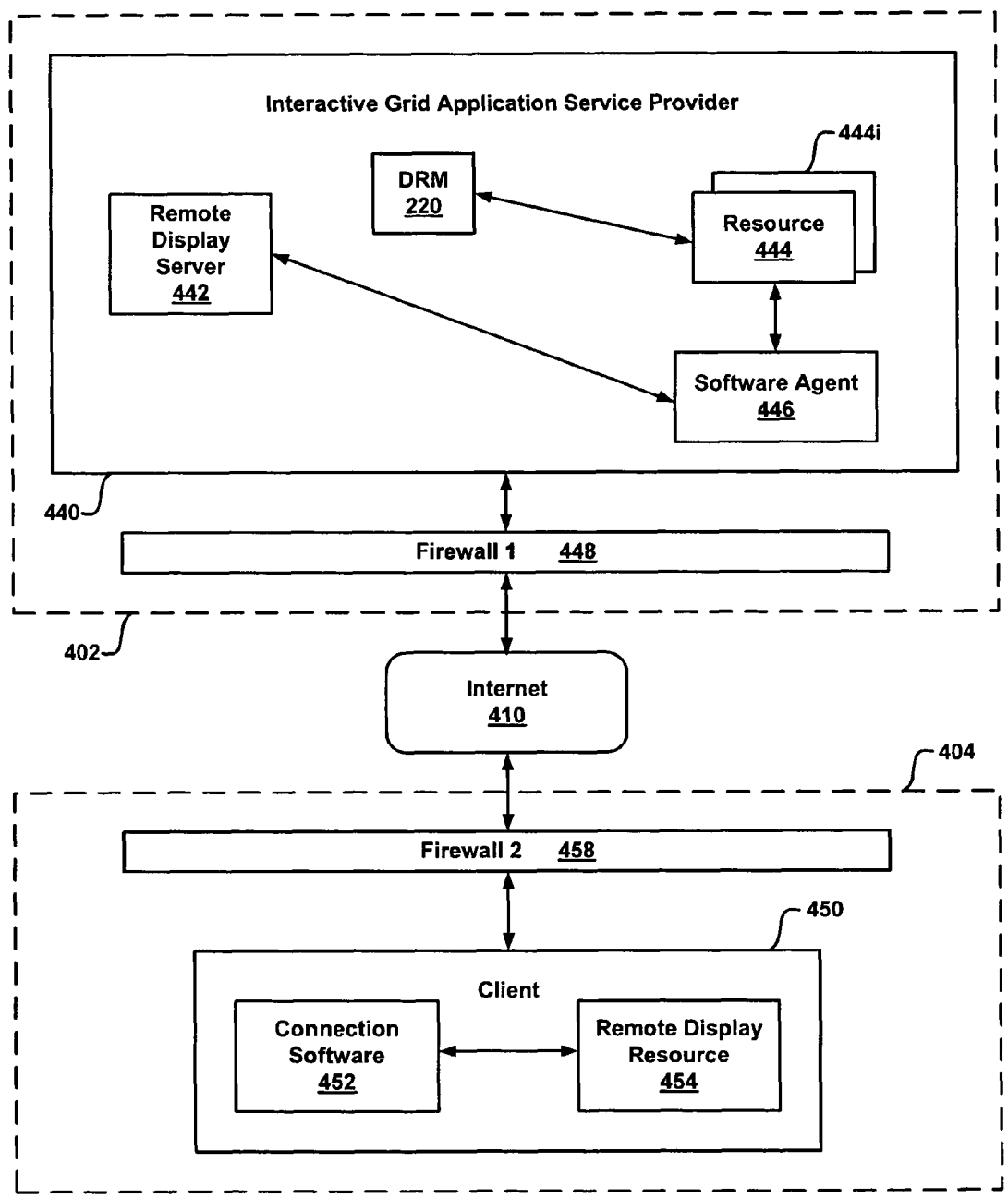
FIG. 4 is a block diagram of an exemplary interactive grid computing system comprising an interactive grid application service provider protected by a firewall and a user protected by a firewall in accordance with an embodiment of the present invention.

Embodiments of the present invention provide a system architecture comprising a computing service provider (e.g., application service provider (ASP)) side and a customer side, as illustrated in FIG. 4. The computing service provider side 402 comprises an interactive grid computing service provider 440 and a firewall 448. The computing service provider 440 comprises several resources 444 . . . 444*i* available for interactive use. Together, the resources comprise a resource pool. Firewall one 448 protects the computing service provider's resources 444 . . . 444*i* from denial-of-service and other attacks.

The customer side 404 comprises a firewall 458 and a client 450. The client is associated with a user. The client 450 comprises connection software 452 and a remote display resource 454. The client 450 first connects to the computing service provider 440 using connection software 452 that resides on the user's local computer system (e.g., client 450).

In one embodiment of the present invention, the connection software may be a web browser application for browsing Internet content. In another embodiment of the invention, the connection software connects to a grid service access point (GSAP) provided externally by computing service provider 440 as a web service (e.g., a web page). In this embodiment, the connection software (e.g., web browser) connects to the GSAP (e.g., web page) to initiate an interactive grid computing session thereafter client 450 can request a resource (e.g., resource 444).

From the GSAP, the request is forwarded to a grid distributed resource management system (DRM) 220. The DRM 220 matches resource requirements specified by the client 450 to the available resources of the computing service provider 440. The customer may request an immediate allocation of resources or may reserve resources for a later time. In an embodiment, at the scheduled time, the DRM system instructs software agent 446 associated with the requested resource (e.g., resource 444) to start the remote display server 442 hosted by the computing service provider.

In one embodiment, the remote display server connects to a communication server hosted by the computing service provider that handles communication to and from the computing service provider after the client 450 is connected. At this time, the client 450 also may connect to the communication server using a remote display resource 454. The communication server, not shown for clarity, facilitates communication between the remote display server 442 on the computing service provider side 402 and the remote display resource 454 on the customer side 404 by going through the firewall one 448 and firewall two 458. The remote display resource 454 displays the desktop of the resource requested on the user's local computer (e.g., client 450). It is appreciated that system 400 supports both interactive and batch jobs.

In an interactive grid computing environment, security is a concern. An computing service provider providing access to desktops for interactive use may reside behind a firewall, such as firewall one 448. A customer, such as client 450 may reside behind another firewall, such as firewall two 458. Moreover, the connection between the computing service provider 440 and the client 450 may go over the Internet 410, so all communication must happen in a secure fashion. Embodiments of the present invention allow a client 450 to communicate with an computing service provider 440 in a secure fashion while traversing over a plurality of firewalls.

Embodiments of the present invention combine the use of encryption and tunneling to provide security while traversing firewalls in an interactive grid-computing environment. Another embodiment of the present invention uses encryption and port forwarding to provide security while traversing firewalls in an interactive grid-computing environment. There are several advantages to using these implementations. For example, the user 450 can download the connection software to allow access to the computing service provider's resources even if behind a firewall. The customer side would not require special configuration as long as it is running a SOCKS proxy server. This is important because the user may not have access to configure the firewall. For example, if the customer resides behind a corporate firewall, it would be unlikely that the user could reconfigure the firewall. For the computing service provider, the only requirement is that it be running a modified secure proxy server at its firewall, as described in one embodiment of the present invention. In this embodiment, no special changes are required to the individual machines that are maintained by the computing service provider. This significantly reduces the efforts needed by the system administrator at the computing service provider in allowing secure access to the resources. It also decouples the problem of security in the intranet at the computing service provider's side from the problem of security across the Internet.

Embodiments of the present invention use virtual network computing (VNC) as the underlying technology that allows remote access to a desktop. The details of VNC are well known in the art and therefore will not be discussed in detail for clarity. It is appreciated that conventional VNC is not secure and does not traverse firewalls.

Embodiments of the invention assume the client is inside a firewall that is hosting a socks proxy server and the ASP's firewall is hosting a remote display proxy server (e.g., VNC server). Embodiments of the invention provide a secure communication channel through both firewalls with, in one embodiment a secure socket layer (SSL) connection. To accomplish this, embodiments of the invention provide a secure socksified version of a remote display viewer (e.g., VNC viewer) that can be installed on the client machine. The socksified version of the VNC viewer encapsulates packets so they can be interpreted by a socks proxy server. The socksified VNC viewer communicates with the VNC proxy server at the ASP's side through a secure connection (e.g., SSL connection) which is tunneled through the socks proxy server at the client's side.

Figure 5:
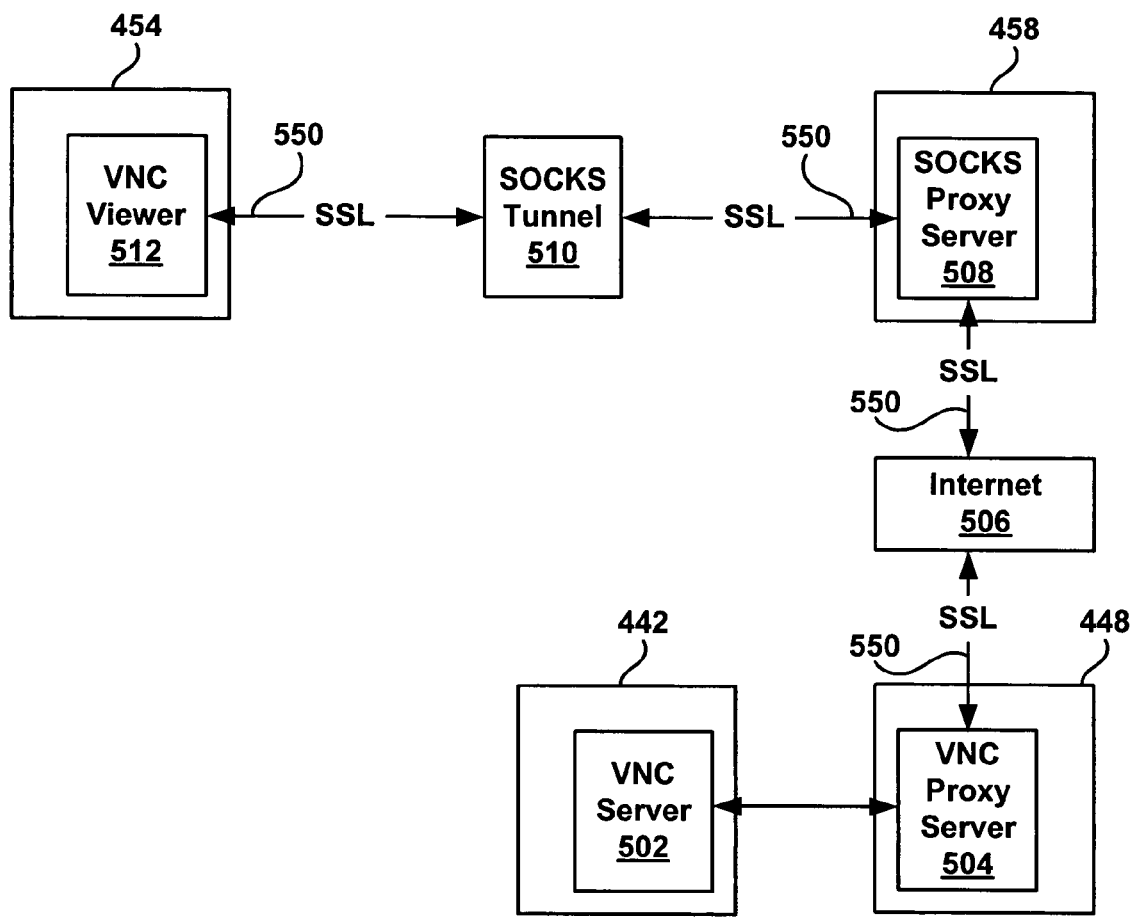
FIG. 5 is a data flow diagram of an exemplary interactive grid computing environment system in accordance with an embodiment of the present invention.

FIG. 5 is a data flow diagram of an exemplary system for providing secure communication through firewalls in an interactive grid environment. System 500 provides a secure connection (e.g., SSL connection 550) between a remote display server (e.g., VNC server 502) of a grid computing service provider and a remote display viewer (e.g., VNC viewer 512) of a user. The VNC viewer 512 corresponds to the remote display resource 454 of FIG. 4 and the VNC server 502 corresponds to the remote display server 442 of FIG. 4. As stated above, the computing service provider (e.g., ASP) has a proxy server 508 at its firewall that allows secure connection to its resources. The socks proxy server 508 corresponds to the firewall two 458 of FIG. 4. The VNC proxy server 504 is an open source proxy server that allows access to the VNC server 502 inside a firewall. The VNC proxy server 504 corresponds to firewall one 448 of FIG. 4. In one embodiment of the invention, the VNC proxy server provides a secure connection through a SSL 550 socket. The present invention provides a VNC proxy server 504 that uses a SSL Socket instead of a Socket at the appropriate source file. Accordingly, the ASP runs the secure VNC proxy server 504 at its firewall and is accessible from the Internet 506. In one embodiment of the invention, the proxy server 504 comprises a plurality of network cards wherein one network card can be used for internal network access and the other can be used for access from the outside (e.g., the Internet 506).

The client side hosts a socks proxy server 508 at its firewall. The socks proxy server 508 provides flexibility because the socks protocol allows any kind of traffic to go through its firewall as long as it is permitted by the configuration of the socks proxy. In one embodiment of the invention, the socks proxy server 508 uses dante as the socks proxy. It is appreciated that the socks proxy server may be another type of proxy server, such as an http proxy.

The client also uses a secure and socksified version of VNC viewer 512 to connect to the VNC proxy 504 at the ASP. In one embodiment of the invention, the VNC viewer 512 is an open source java implementation of VNC viewer. Furthermore, in one embodiment, jsocks, an open source library, is used to socksify java client source code. In other words, the implementation of the VNC viewer 512 is socksified, which allows it to communicate with the socks proxy server 508. In one embodiment, the VNC viewer 512 communicates with the socks proxy server 508 using socksv4 protocol. Embodiments of the present invention make the connection from the VNC viewer 512 to the VNC proxy server 504 by enabling SSL socket to be tunneled through the socks proxy 508 by socks tunnel 510.

The following code in Table 1 can be implemented within the VNC viewer to socksify it and make it secure, in accordance with an embodiment of the present invention. The following code in Table 1 sets up a default socks proxy with a username, a proxy host and proxy port number. This alerts the VNC viewer where the socks proxy is running. Then a connection (e.g., tunnel) is established between the VNC viewer and the proxy server using a destination host and a destination port address. Then a handle is retrieved to facilitate the creation of a secure socket. The handle is then used to create a secure connection through the tunnel.

TABLE 1

Figure 6:
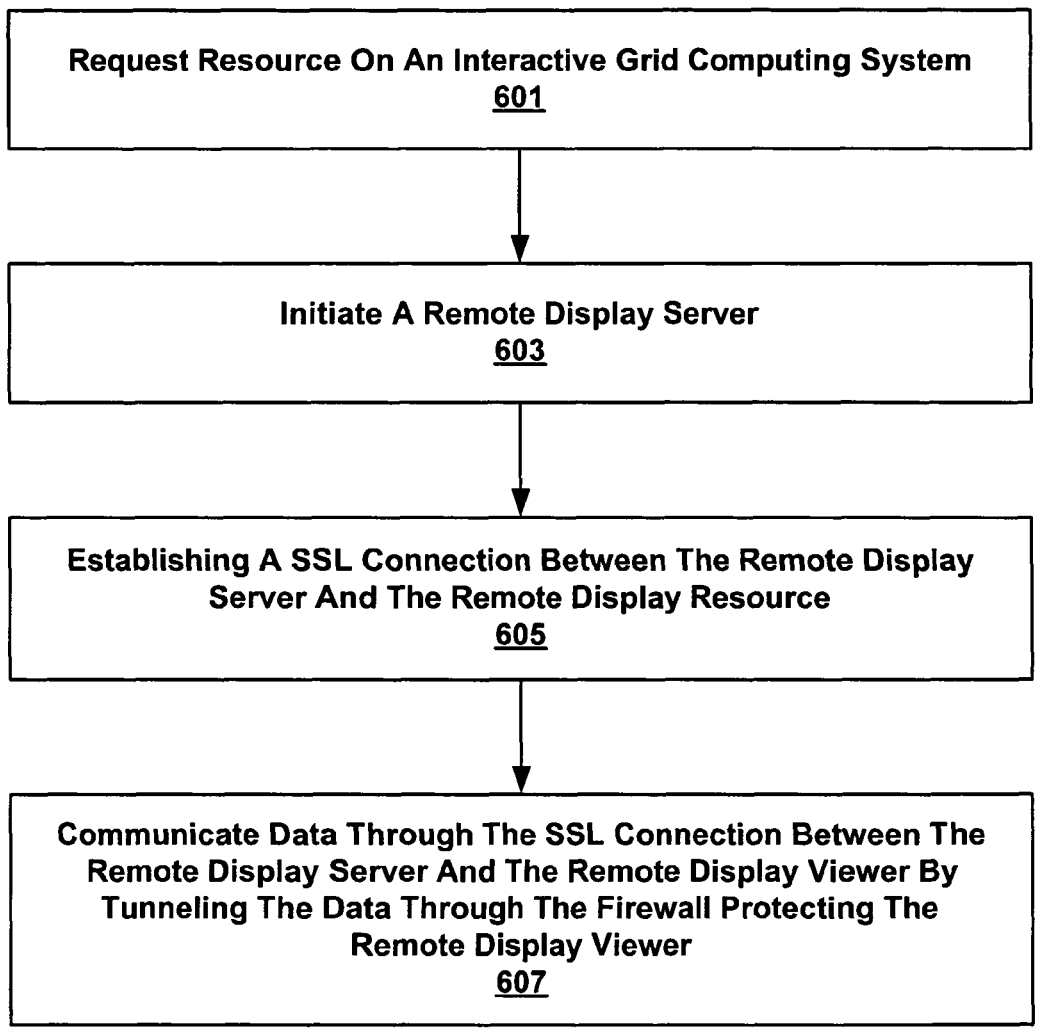
FIG. 6 is a flow chart of an exemplary process for providing an interactive grid computing application across a firewall in accordance with an embodiment of the present invention.

Proxy.setDefaultProxy (proxyhost, proxyport, username);
Tunnel= new SocksSocket (destinationhost, destinationport);
Fact= (SSLSocketFactory) SSLSocketFactory.getDefault( );
Socket=fact.createSocket(tunnel, destinationhost, destinationport, flag);

FIG. 6 is a flow diagram of an exemplary process 600 for providing an interactive grid session across firewalls in accordance with an embodiment of the present invention. Process 600 begins with step 601 comprising receiving a request by a client for a resource on an interactive grid computing system. As stated above, an ASP may provide a grid access point, for example a web page accessible from the Internet. In one embodiment of the invention, a user session is authenticated before the user can gain access to the resources provided by the ASP. Once a resource is requested, the next step 603 is to initiate a remote display server hosted by the ASP. As stated above, a software agent associated with the requested resource initiates the remote display server. The next step 605 is to establish a secure connection (e.g., secure socket layer) between the remote display server and the remote display viewer. The remote display viewer communicates with the remote display server to display the graphical desktop of the requested resource. The last step 607 is to communicate data between the remote display server and the remote display viewer through the secure connection.

In one embodiment of the invention, the data is communicated through the SSL connection by tunneling the data through firewalls. As stated above, a modified VNC viewer is used to provide a secure socksified connection. This enables SSL socket to be tunneled through the socks proxy server on the client side. In an embodiment of the invention, the communication between the remote display server and the remote display client is encrypted to provide an additional layer of security.

Embodiments of the present invention, secure access to a remote desktop across firewalls in an interactive grid environment has been described. While the present invention has been described in particular embodiments, it should be appreciated that the present invention should not be construed as limited by such embodiments, but rather construed according to the following Claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An interactive grid computing system comprising:
 a computing service provider side comprising:
  an interactive grid computing service provider comprising:
   a grid distributed resource management system (grid DRM) configured for managing a plurality of execution nodes;
   at least one resource that said grid DRM reserves for a client based on a request from said client, through a submission node, for an interactive session for a service that said resource is enabled to provide, wherein said at least one resource comprises at least one remote execution node of said plurality of remote execution nodes and at least one fine grained resource, said at least one resource reserved for a requested duration of said interactive session;
   a first firewall coupled to said at least one resource and configured for protecting said at least one resource, wherein said first firewall is hosting a VNC proxy server;
   a remote display server coupled to said first firewall for providing, at a requested time, secure access, by said submission node, to said at least one resource over a secure connection and for providing interactive graphical data associated with said at least one resource, wherein said client is enabled to communicate directly with said at least one resource over said secure connection during said interactive session;
   a software agent associated with said at least one resource, wherein if said at least one resource is requested by said client, said software agent initiates interactive communication between said remote display server and a remote display resource; and
 a client side coupled to said interactive grid computing service provider, said client side comprising:
  a client comprising said remote display resource configured for communicating with said remote display server through said secure connection to access said interactive graphical data provided by said remote display server, wherein said remote display resource is a virtual network computing viewer modified for secure access and for viewing a graphical desktop display associated with said at least one resource, wherein a modification of said virtual network computing viewer comprises:
   an established connection between said virtual network computing viewer and said VNC proxy server using a destination host and a destination port address;
   a retrieved handle configured for facilitating a creation of a secure socket, said retrieved handle used to create said secure connection through a socks tunnel; and
  a second firewall configured for protecting said client, said second firewall hosting a SOCKS proxy server, wherein said secure connection is through said socks tunnel and is used to tunnel said interactive graphical data through said second firewall.

2. The system as described in claim 1 wherein said remote display resource provides a socksified SSL connection.

3. The system as described in claim 1 wherein said interactive graphical data provided by said remote display server is encrypted.

4. The system as described in claim 1 wherein said interactive graphical data is a graphical desktop display associated with said resource.

5. The system as described in claim 1 wherein said first firewall comprises a VNC proxy server.

6. A method for interactively accessing a remote desktop across a secure network comprising:
  receiving a request for at least one resource provided by a grid distributed resource management system (grid DRM), said grid DRM configured for managing a plurality of execution nodes, wherein said at least one resource is protected by a first firewall, wherein said at least one resource comprises at least one remote execution node of said plurality of remote execution nodes and at least one fine grained resource, wherein said first firewall comprises a VNC proxy server;
  initiating, at a requested time, a remote display server, said remote display server configured for providing interactive graphical data associated with said at least one resource to a remote display viewer, wherein said remote display viewer is protected by a second firewall and is a virtual network computing viewer modified for secure access and for viewing a graphical desktop display associated with said at least one resource, wherein modifying said virtual network computing viewer comprises:
    establishing a secure socket layer (SSL) connection between said virtual network computing viewer and said VNC proxy server using a destination host and a destination port address, wherein said virtual network computing viewer is enabled to communicate directly with said VNC proxy server;
    retrieving a handle that is configured for facilitating a creation of a secure socket;
    utilizing said retrieved handle to create said secure connection through a socks tunnel; and
  communicating interactive graphical data between said virtual network computing viewer and said VNC proxy server directly through said SSL connection, and wherein said second firewall hosts a SOCKS proxy server, wherein said secure connection is through said socks tunnel and is used to tunnel said interactive graphical data through said second firewall.

7. The method as described in claim 6 further comprising receiving said request at said grid DRM from a web browser.

8. The method as described in claim 6 further comprising encrypting said graphical data.

9. The method as described in claim 6 further comprising authenticating a user associated with said virtual network computing viewer.

10. The method as described in claim 9 further comprising authenticating said user at an Internet based grid service access point.

11. An interactive grid computer system comprising a processor coupled to a bus and a memory coupled to said bus and comprising instructions that when executed implement a method for accessing a remote desktop across firewalls comprising:
  receiving a request for at least one resource provided by a grid distributed resource management system (grid DRM), said grid DRM configured for managing a plurality of execution nodes, wherein said at least one resource is protected by a first firewall, wherein said at least one resource comprises at least one remote execution node of said plurality of remote execution nodes and at least one fine grained resource, wherein said first firewall hosts a VNC proxy server;
  initiating, at a requested time, a remote display server, said remote display server configured for providing interactive graphical data associated with said at least one resource to a remote display viewer, wherein said remote display viewer is protected by a second firewall and is a virtual network computing viewer modified for secure access and for viewing a graphical desktop display associated with said at least one resource, wherein modifying said virtual network computing viewer comprises:
    establishing a secure socket layer (SSL) connection between said virtual network computing viewer and said VNC proxy server using a destination host and a destination port address, wherein said virtual network computing viewer is enabled to communicate directly with said VNC proxy server;
    retrieving a handle that is configured for facilitating a creation of a secure socket;
    utilizing said retrieved handle to create said secure connection through a socks tunnel; and
  communicating interactive graphical data between said virtual network computing viewer and said VNC proxy server directly through said SSL connection, and wherein said second firewall hosts a SOCKS proxy server, wherein said secure connection is through said socks tunnel and is used to tunnel said interactive graphical data through said second firewall.

12. The interactive grid computer system as described in claim 11 wherein said method further comprises receiving said request at said grid DRM from an application.

13. The interactive grid computer system as described in claim 11 wherein said method further comprises encrypting said graphical data.

14. The interactive grid computer system as described in claim 11 wherein said method further comprises authenticating a user associated with said virtual network computing viewer.

15. The interactive grid computer system as described in claim 11 wherein said method further comprises authenticating said user at an Internet based grid service access point.

* * * * *

UNITED STATES PATENT AND TRADEMARK OFFICE
CERTIFICATE OF CORRECTION

| | | |
|---|---|---|
| PATENT NO. | : 8,037,178 B1 | Page 1 of 1 |
| APPLICATION NO. | : 10/666093 | |
| DATED | : October 11, 2011 | |
| INVENTOR(S) | : Bikash Agarwalla et al. | |

It is certified that error appears in the above-identified patent and that said Letters Patent is hereby corrected as shown below:

In column 11, line 3, in Claim 2, delete "claim 1" and insert -- claim 1, --, therefor.

Signed and Sealed this
Twenty-ninth Day of May, 2012

David J. Kappos
*Director of the United States Patent and Trademark Office*